United States Patent [19]
Yajima et al.

[11] Patent Number: 4,663,229
[45] Date of Patent: May 5, 1987

[54] CONTINUOUS INORGANIC FIBERS AND PROCESS FOR PRODUCTION THEREOF

[75] Inventors: Mantaro Yajima, Higashihiroshima; Akiko Noda, Tokyo; Kiyohito Okamura, Oharai; Yoshio Hasegawa, Oharai; Takemi Yamamura, Oharai, all of Japan

[73] Assignee: UBE Industries, Ltd., Yamaguchi, Japan

[21] Appl. No.: 702,649

[22] Filed: Feb. 19, 1985

Related U.S. Application Data

[62] Division of Ser. No. 330,999, Dec. 15, 1981, Pat. No. 4,515,742.

[30] Foreign Application Priority Data

Dec. 18, 1980 [JP] Japan ................. 55-178112
Dec. 25, 1980 [JP] Japan ................. 55-182817

[51] Int. Cl.[4] .............................. D02G 3/00
[52] U.S. Cl. ...................... 428/364; 428/379
[58] Field of Search ............... 428/364, 379; 423/345; 501/35, 38; 525/477; 264/63, 65, 177 F

[56] References Cited

U.S. PATENT DOCUMENTS

| | | | |
|---|---|---|---|
| 4,100,233 | 7/1978 | Yajima et al. | 264/65 X |
| 4,283,376 | 8/1981 | Yajima et al. | 423/345 |
| 4,342,712 | 8/1982 | Yajima et al. | 264/63 |
| 4,347,347 | 8/1982 | Yajima et al. | 528/35 X |
| 4,359,559 | 11/1982 | Yajima et al. | 528/35 X |

Primary Examiner—Lorraine T. Kendell
Attorney, Agent, or Firm—Ladas & Parry

[57] ABSTRACT

Continuous inorganic fibers consisting substantially of Si, Zr and C and optionally of O, said fibers being composed of (1) an amorphous material consisting substantially of Si, Zr and C and optionally of O, or (2) an aggregate consisting substantially of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å, in which amorphous $SiO_2$ and $ZrO_2$ sometimes exist in the neighborhood of these ultrafine crystalline particles, or (3) a mixture of said amorphous material (1) and said aggregate (2) of ultrafine crystalline particles. The aforesaid continuous inorganic fibers can be produced by the following steps: a first step of preparing a semi-inorganic block copolymer comprising polycarbosilane blocks having a main chain skeleton composed mainly of carbosilane units of the formula $-Si-CH_2-$, each silicon atom of said carbosilane units having bonded thereto a side-chain group selected from the class consisting of hydrogen, lower alkyl and phenyl, and zirconoxane units of the formula $-Sr-O-$; a second step of preparing a spinning dope of said semi-inorganic block copolymer and spinning the dope; a third step of subjecting the resulting fibers to a treatment of rendering them infusible under tension or under no tension; and a fourth step of firing the infusible fibers at a temperature of 800° to 1800° C. in a vacuum or in an atmosphere of an inert gas or a reducing gas.

8 Claims, 2 Drawing Figures

CONTINUOUS INORGANIC FIBERS AND PROCESS FOR PRODUCTION THEREOF

This is a divisional of co-pending application Ser. No. 330,999 filed on Dec. 15, 1981 now U.S. Pat. No. 4,515,742.

BACKGROUND OF THE INVENTION

This invention relates to novel continuous inorganic fibers composed mainly of Si, Zr and C or of Si, Zr, C and O and having very good properties, and a process for production thereof.

The present inventors disclosed in U.S. Pat. No. 4,100,233 a technique of obtaining continuous silicon carbide fibers having good mechanical and thermal properties by spinning polycarbosilane having silicon and carbon as main skeletal components, rendering the resulting fibers infusible, and then firing them.

It has now been found in accordance with this invention that composite inorganic carbide fibers having a unique structure and superior properties to conventional silicon carbide fibers obtained from polycarbosilane can be produced by spinning a semi-inorganic block copolymer whose main chain skeleton is composed of Si, Zr, C and O, rendering the resulting fibers infusible and then firing them.

SUMMARY OF THE INVENTION

The present invention provides continuous inorganic fibers of a novel structure consisting substantially of Si, Zr and C and optionally of O, said fibers being composed substantially of (1) an amorphous material consisting substantially of Si, Zr and C and optionally of O, or (2) an aggregate consisting substantially of ultrafine crystalline particles of $\beta$-SiC, ZrC, a solid solution of $\beta$-SiC and ZrC and ZrC$_{1-x}$ wherein $0<x<1$ and having a particle diameter of not more than 500 Å, in which amorphous SiO$_2$ and ZrO$_2$ sometimes exist in the neighborhood of these ultrafine crystalline particles, or (3) a mixture of said amorphous material (1) and said aggregate (2) of ultrafine crystalline particles.

According to this invention, there is also provided a process for producing said continuous inorganic fibers consisting substantially of Si, Zr and C or Si, Zr, C and O, which comprises a first step of preparing a semi-inorganic block copolymer comprising polycarbosilane blocks having a main chain skeleton composed mainly of carbosilane units of the formula $-(Si-CH_2)-$, each silicon atom of said carbosilane units having bonded thereto a side-chain group selected from the class consisting of hydrogen, lower alkyl and phenyl, and zirconoxane units of the formula $-(Zr-O)-$; a second step of preparing a spinning dope of said semi-inorganic block copolymer; a third step of subjecting the resulting fibers to a treatment of rendering them infusible under tension or under no tension; and a fourth step of firing the infusible fibers at a temperature of 800° to 1800° C. in vacuum or in an atmosphere of an inert gas or a reducing gas.

DETAILED DESCRIPTION OF THE INVENTION

Figure 1:
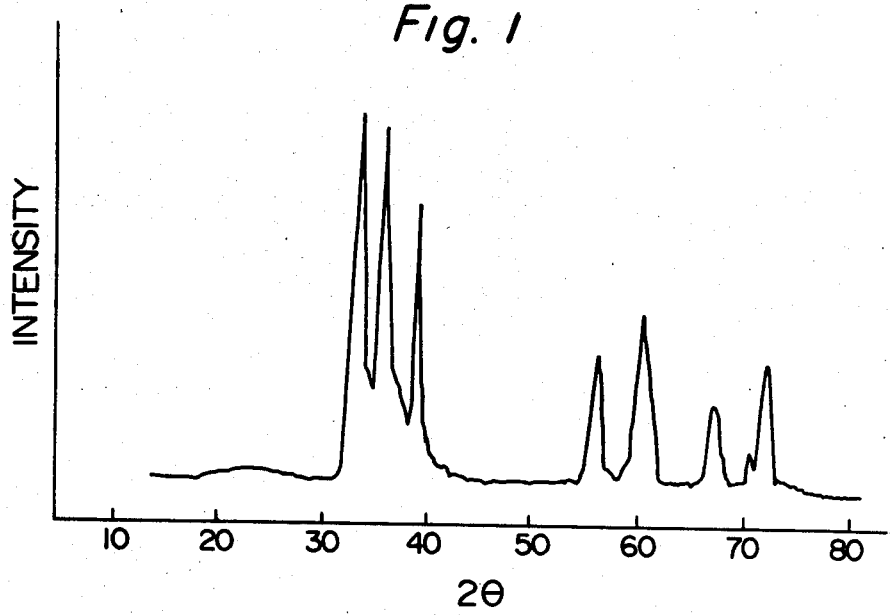
FIG. 1 shows an X-ray powder diffraction pattern of the continuous inorganic fibers obtained in Example 1-II.

To facilitate an understanding of the present invention, the process for producing fibers in accordance with this invention is first described.

The first step of the process of this invention comprises preparing a semi-inorganic block copolymer comprising polycarbosilane blocks having a main chain skeleton consisting mainly of carbosilane units of the formula $-(Si-CH_2)-$, each silicon atom of said carbosilane units having bonded thereto a side-chain group selected from the class consisting of hydrogen, lower alkyl and phenyl, and zirconoxane units of the formula $-(Zr-O)-$. The term "semi-inorganic polymer", as used herein, means that the main chain of the polymer is composed of inorganic structural units such as $-(Si-C)-$ or $-(Zr-O)-$, and the side-chain group bonded to its main chain is an organic group.

The semi-inorganic block copolymer used as a starting material in this invention includes two types of polymer. A first type is an organometallic copolymer having a number average molecular weight of about 1000 to about 50000 composed of polycarbosilane blocks and polyzirconosiloxane blocks which are crosslinked with each other. This organometallic copolymer and a process for production thereof are the subject matter of the copending U.S. patent application Ser. No. 160,516 of Yajima et al. filed on June 18, 1980 now U.S. Pat. No. 4,347,347, and are described in detail in the specification of the copending application. A second type is polyzirconocarbosilane having a number average molecular weight of about 700 to 100,000 obtained by bonding at least some of the silicon atoms of polycarbosilane blocks to the zirconium atoms of an organozirconium compound through an oxygen atom. The polyzirconocarbosilane and a method for its production are the subject matter of U.S. patent application Ser. No. 208,744 of Yajima et al. filed on Nov. 20, 1980, now U.S. Pat. No. 4,359,559 and are described in detail in the specification of this U.S. application.

The starting materials used in the first step are described below.

The first starting semi-inorganic block copolymer is an organometallic copolymer having a number average molecular weight of about 1000 to about 50000 composed of polycarbosilane blocks and polyzirconossiloxane blocks which are crosslinked with each other. This copolymer is obtained by mixing.

(1) polycarbosilane with a number average molecular weight of about 500 to about 10000 having a main chain skeleton composed mainly of carbosilane units of the formula $-(Si-CH_2)-$, each silicon atom of the carbosilane units substantially having bonded thereto a side-chain group selected from the class consisting of hydrogen, lower alkyl and phenyl, with (2) polyzirconosiloxane with a number average molecular weight of about 500 to about 10000 having a main chain skeleton composed mainly of zirconoxane units of the formula $-(Ti-O)-$ and siloxane units of the formula $-(Si-O)-$, most of the zirconium atoms of said zirconoxane units having bonded thereto a side-chain group selected from the class consisting of lower alkoxy, phenoxy and acetylacetoxy, most of the silicon atoms of said siloxane units having bonded thereto a side-chain group selected from the class consisting of lower alkyl and phenyl, and the ratio of the total number of said zirconoxane units to that of said siloxane units being in the range of about 30:1 to about 1:30, in such mixing proportions that the ratio of the total number of said carbosilane units to the sum of the total number of said zirconoxane units and the total number of said siloxane units is in the range of about 100:1 to about 1:100; and heating the resulting mixture in an organic solvent (e.g., benzene, toluene, xylene, or tetrahydrofuran) in an atmosphere inert to the reaction (for example, in an atmosphere of a gas inert to the reaction, such as nitrogen, argon or hydrogen) to bond at least some of the silicon atoms of said polycarbosilane with at least some of the zirconium atoms and/or silicon atoms of said polyzirconosiloxane through an oxygen atom.

In the above process for production of the first starting material, at least one of side-chain groups bonded to the silicon atoms of the carbosilane units is preferably a hydrogen atom.

The temperature at which the polycarbosilane (1) is reacted with the polyzirconosiloxane (2) can be varied over a wide range. For example, the mixture may be heated to a temperature below the boiling point of the organic solvent used. Or it may be heated to the boiling point of the organic solvent or to a higher temperature, after distilling off the organic solvent. Preferably, the reaction temperature is generally not more than 500° C.

In addition to the side-chain groups, a hydroxyl group may be bonded to the silicon atoms of the terminal groups of the polycarbosilane used to produce the first starting material.

Methods for production of polycarbosilane are known, and the polycarbosilane (1) above may be produced by such a known method. For example, Fritz: Angew. Chem., 79, page 657 (1967) discloses a process for production of polycarbosilane by directly polymerizing a monosilane. U.S. Pat. No. 4,052,430 to Yajima et al. discloses a process for producing polycarbosilane by converting a monosilane to a polysilane and then polymerizing the polysilane. Of the polycarbosilanes (1), those having a main chain skeleton composed substantially only of structural units of the formula $-(Si-CH_2)-$ can be produced by the aforesaid known methods.

Modified polycarbosilane partly containing siloxane linkages produced by the method disclosed in U.S. Pat. No. 4,220,600 to Yajima et al. is an especially suitable polycarbosilane as material (1). This modified polycarbosilane is polycarbosilane partly containing siloxane linkages and having a number average molecular weight of 500 to 10000, which is composed mainly of structural units (A) and (B) below, the ratio of (A) to (B) being from 5:1 to 200:1.

$$-\underset{\underset{R_2}{|}}{\overset{\overset{R_1}{|}}{Si}}-CH_2- \quad (A)$$

$$-\underset{\underset{R_4}{|}}{\overset{\overset{R_3}{|}}{Si}}-O \quad (B)$$

wherein $R_1$, $R_2$, $R_3$ and $R_4$, independently from each other, represent hydrogen, lower alkyl or phenyl. This modified polycarbosilane can be produced by adding 0.01 to 15% by weight of polyborosiloxane having B, Si and O as main skeletal components with at least part of the side chain of Si having a phenyl group, to a polysilane of the structure

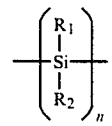

wherein n is at least 3, and $R_1$ and $R_2$ are as defined hereinabove, and heating the mixture in an atmosphere inert to the reaction at a temperature of usually at least 250° C., preferably at 300° to 500° C. for a period of usually 8 to 10 hours.

The polyzirconosiloxane (2) used for production of the first starting material is polyzirconosiloxane having a number average molecular weight of about 500 to about 10000 and a main chain skeleton composed of zirconoxane units $-(Zr-O)-$, and siloxane units $-(Si-O)-$, the ratio of the total number of the zirconoxane units to that of the siloxane units being from 30:1 to 1:30, most of the silicon atoms of the siloxane units having a side-chain group selected from the class consisting of lower alkyl and phenyl, and most of the zirconium atoms of the zirconoxane units having a side-chain group selected from lower alkoxy, phenoxy or acetylacetoxy. In addition to the aforesaid side-chain group, a hydroxyl group is sometimes bonded to the silicon atoms or zirconium atoms present in the terminal groups of the polyzirconosiloxane.

Methods for production of polyzirconosiloxane are known, and the polyzirconosiloxane used in the first step of the process of this invention may be produced by such a known method.

A method for synthesis of polyzirconosiloxane is described, for example, in Inorganic Polymers (F. G. A. Stone, Academic Press, 1962).

The polyzirconosiloxane (2) is soluble in an organic solvent such as benzene, toluene, xylene, acetone or tetrahydrofuran.

If among the siloxane units of formula $-(Si-O)-$, chain-terminating monofunctional siloxane units located at the terminals of the polymer chain are excluded, and only those siloxane units which extend the chain are considered, it is seen that these chain-extending siloxane units include three types of siloxane units, i.e.

difunctional groups

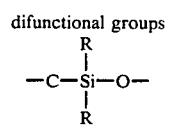

trifunctional groups

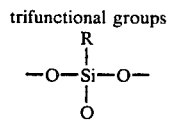

tetrafunctional groups

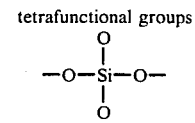

R in the formulae represents an organic group. These three types of siloxane units can be the chain-extending units of the polyzirconosiloxane (2). If the content of tetrafunctional siloxane units increases, the polymer generally has a larger proportion of crosslinked structure and becomes insoluble in organic solvents. Accordingly, it is necessary that in the polyzirconosiloxane (2), most of the chain-extending siloxane units should be difunctional or trifunctional siloxane units, and the content of the tetrafunctional siloxane units should be small. Accordingly, most of the silicon atoms of the chain-extending siloxane units should have bonded thereto one or two side-chain organic groups R (lower alkyl or phenyl).

Likewise, among the zirconoxane units of the formula +Zr—O+, chain-extending zirconoxane units include difunctional, trifunctional and tetrafunctional groups. For the same reason as mentioned above, it is necessary that in the polyzirconosiloxane (2), most of the chain-extending zirconoxane units should have two side-chain organic group (lower alkoxy) (difunctional), or one such side-chain organic group (trifunctional).

In the polyzirconosiloxane (2), the ratio of the total number of the zirconoxane units to that of the siloxane units is in the range of from 30:1 to 1:30.

The polyzirconosiloxane (2) is a polymer having a skeleton composed of randomly bonded siloxane units +Si—O+ and zirconoxane units +Zr—O+, and can assume various structures such as in the form of chains, rings, ladders, cages or networks.

In the first step of the process of this invention, the organometallic copolymer as the first starting material can be produced by mixing the aforesaid polycarbosilane and polyzirconosiloxane in such proportions that the ratio of the total number of +Si—CH$_2$+ units of the polycarbosilane to the sum of the total number of +Zr—O+ units and the total number of +Si—O+ units in the polyzirconosiloxane is in the range of from 100:1 to 1:100, and reacting the resulting mixture under the specified conditions described hereinabove.

Gel permeation chromatography (GPC) and infrared absorption spectroscopy (IR) of the resulting organometallic copolymer show that the reaction which takes place between the polycarbosilane and the polyzirconosiloxane is a reaction which mainly involves liberation of some of the hydrogen atoms bonded as side-chain groups to the silicon atoms of the structural units +Si—CH$_2$+ present in the main chain skeleton of polycarbosilane, and the bonding of the silicon atoms to some of the silicon atoms and/or zirconium atoms of the structural units (—Si—O— and/or —Zr—O—) present in the main chain skeleton of the polyzirconosiloxane through an oxygen atom. (This is described in detail in the copending U.S. patent application Ser. No. 160,516 cited hereinabove.) The organometallic copolymer formed in the first step is a crosslinked blocked copolymer having a number average molecular weight of 1000 to 50000 obtained by the crosslinking of polycarbosilane with polyzirconoxane. It is a thermoplastic material which usually melts when heated at a temperature of 50° to 400° C. It is also soluble in solvents such as benzene, toluene, xylene and tetrahydrofuran.

The second starting material (semi-inorganic block copolymer) used for production of the continuous inorganic fibers is described.

The second starting material is polyzirconocarbosilane having a number average molecular weight of about 700 to 100,000, which is obtained by mixing polycarbosilane with a number average molecular weight of 200 to 10000 mainly having a main chain skeleton expressed by the general formula

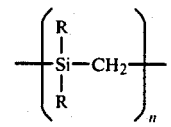

wherein R represents a hydrogen atom, a lower alkyl group or a phenyl group, with an organozirconium compound of the general formula ZrX$_4$ wherein X represents an alkoxy group having 1 to 20 carbon atoms, a phenoxy group or an acetylacetoxy group, in such proportions that the ratio of the total number of the structural units +Si—CH$_2$+ of the polycarbosilane to that of the structural units +Zr—O+ of the organozirconium compound is in the range of from 2:1 to 200:1; and heating the resulting mixture in an atmosphere inert to the reaction, thereby to bond at least some of the silicon atoms of the polycarbosilane to the zirconium atoms of the organozirconium compound through an oxygen atom.

The polyzirconocarbosilane (second starting material) obtained as above is a semi-inorganic block copolymer having a number average molecular weight of about 700 to 100,000 comprising polycarbosilane blocks having a main chain skeleton composed mainly of carbosilane units of the formula +Si—CH$_2$+, each silicon atom of said carbosilane units having bonded thereto a side-chain group selected from the group class consisting of hydrogen, lower alkyl and phenyl, and zirconoxane units of the formula +Zr—O+, in which at least some of the silicon atoms of the polycarbosilane blocks are bonded to the zirconium atoms of the zirconoxane units through an oxygen atom. In the polyzirconocarbosilane, the ratio of the total number the structural units +Si—CH$_2$+ to that of the structural units +Zr—O+ is in the range of from 2:1 to 200:1.

When the functionality of the zirconium atom is considered, the polyzirconocarbosilane as the second starting material includes a monofunctional polymer, a difunctional polymer, a trifunctional polymer and a tetrafunctional polymer shown below.

(monofunctional polymer)

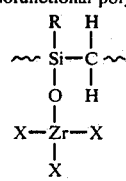

(difunctional polymer)

-continued

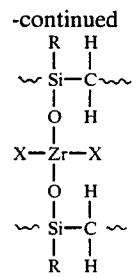

(trifunctional polymer)

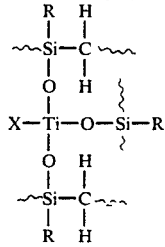

(tetrafunctional polymer)

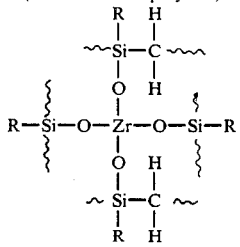

(R and X are as defined hereinabove.)

In the above formulae, R and R' are as defined hereinabove.

In the second step of the process of this invention, the semi-inorganic block copolymer obtained in the first step is heat-melted to form a spinning dope, and if desired, it is filtered to remove materials detrimental to spinning such as microgels and impurities. The dope is then spun by using a normally used spinning apparatus for synthetic fibers. The temperature of the spinning dope during spinning differs depending upon the softening point of the starting copolymer, but temperatures in the range of 50° to 400° C. are advantageous. If desired, a spinning cylinder is attached to the spinning apparatus, and the atmosphere of the inside of the spinning cylinder is replaced by at least one gas selected from air, inert gases, hot air, hot inert gases, steam and ammonia gas. Fine-denier fibers can be obtained by increasing the rate of wind up. The spinning speed in the melt spinning process described above differs depending upon the average molecular weight, molecular weight distribution and molecular structure of the starting copolymer. Good results are obtained when it is in the range of 50 to 50000 m/min.

Alternatively, the second step of the process of this invenntion comprises dissolving the copolymer obtained in the first step in a solvent capable of dissolving it, such as benzene, toluene or xylene to form a spinning dope, optionally filtering it to remove materials detrimental to spinning, such as microgels and impurities, spinning the dope by a dry-spinning method by a spinning normally used spinning apparatus for synthetic fibers, and increasing the speed of wind up to obtain the desired fine-denier fibers.

If desired, it is possible to attach a spinning cylinder to the spinning apparatus in this spinning step, replacing the atmosphere inside the cylinder by a mixture of a saturated vapor of at least one of the solvents described hereinabove and at least one gas selected from air and inert gases, or by an atmosphere of air, inert gas, hot air, hot inert air, steam, ammonia gas, hydrocarbon gas or organosilicon compound gas, thereby controlling solidification of the spun fibers within the cylinder.

In the third step of the present invention, the spun fibers are heated at a temperature in the range of 50° to 400° C. for several minutes to 30 hours in an oxidizing atmosphere under tension or under no tension to render these fibers infusible. The purpose of heating at low temperatures is to form a thin oxide film on the surface of the spun fibers and to prevent the spun fibers from melting and flowing out in the subsequent firing step. The oxide film serves to prevent the molten spinning fibers from flowing out in the subsequent firing step and from adhering to the adjacent fibers upon contact.

The above heating is carried out preferably in an atmosphere of at least one oxidizing gas selected from the group consisting of air, ozone, oxygen, chlorine gas, bromine gas and ammonia gas. When the low temperature heating in the above gaseous atmosphere is carried out at less than 50° C., an oxide coating cannot be formed on the spun fibers. At temperatures above 400° C., the oxidation proceeds too much. Good results are obtained when the heating temperature is in the range of from 50° to 400° C. The time during which the aforesaid low-temperature heating is carried out has to do with the heating temperature, and a suitable period of time is from several minutes to 30 hours.

In addition to the oxidizing gaseous atmosphere, an aqueous solution of $KMnO_4$, $K_2Cr_2O_7$, $H_2O_2$ or other inorganic peroxides can be used as the heating atmosphere. At this time, the temperature is preferably from room temperature to 90° C., and the time is preferably from 0.5 to 5 hours.

The semi-inorganic block copolymer obtained in the first step of the process of this invention has a different molecular weight distribution depending upon the synthesizing conditions, and its softening point may be below about 50° C. according to the content of low-molecular-weight compounds. In such a case, the softening point of the copolymer can be adjusted to at least 50° C. by decreasing the amounts of the low-molecular-weight compounds by the compounds to be described hereinbelow. If the copolymer having a softening point of below 50° C. is spun into fibers and the spun fibers are heated in an oxidizing atmosphere at a temperature of 50° to 400° C. in order to render them infusible, the shape of the fibers may sometimes be lost. When The copolymer obtained in the first step has a softening point of less than about 50°, an additional step of removing low-molecular-weight compounds from the copolymer obtained in the first step may be performed after the first step but before the second step. Typically, this additional step can be performed by extracting the low-molecular-weight compounds in the copolymer obtained in the first step with alcohols such as methyl alcohol or ethyl alcohol to provide a copolymer having a softening point of at least about 50° C., or the copolymer is heated under reduced pressure or in an inert gaseous atmosphere at a temperature of not more than 500° C. to remove the low-molecular-weight compounds by distillation and to form a copolymer having a softening point of at least 50° C. Distillation of the copolymer in an oxidizing atmosphere containing air, oxygen gas, etc. in this additional step is undesirable because the copolymer is oxidized to decompose or gel it. If the heating temperature exceeds 500° C., decomposition of the copolymer becomes vigorous. Accordingly, the heating temperature should be limited to 500° C. or below.

In an alternative embodiment of the third step, the fibers may be rendered infusible by exposing the fibers to irradiation of γ-rays or electron beams in an oxidizing atmosphere or a nonoxidizing atmosphere under tension or under no tension while optionally heating them. The purpose of irradiating γ-rays or electron beams is to polymerize the copolymer forming the spun fibers further. As a result the copolymer is decomposed without softening, and a loss of their fibrous shape owing to melting in the subsequent firing step can be prepared.

Irradiation of γ-rays or electron beams can be performed in a non-oxidizing gas such as an inert gas or in vacuum at room temperature. The dose of irradiation is suitably $10^6$ to $10^{10}$ roentgens. Irradiation of γ-rays or electron beams can also be performed in an atmosphere of an oxidizing gas selected from air, ozone, oxygen, chlorine gas, bromine gas and ammonia gas. If desired, by performing the irradiation at a temperature of 50° to 200° C., a thin oxide coating can be formed on the surface of the spun fibers and the spun fibers can be rendered infusible within a shorter period of time. When γ-rays or electron beams are used to render the fibers infusible, the copolymer obtained in the first step should be solid at room temperature. If the copolymer obtained in the first step is viscous and flowable, it must be converted into a solid copolymer which is solid at room temperature, by removing low-molecular-weight compounds in it by solvent extraction or distillation in the manner described hereinabove in order to treat it by irradiation of γ-rays or electron beams.

When the treatment of rendering the spun fiber infusible is carried out under no tension, the spun fibers will become wavy owing to shrinkage. But this may be corrected in the subsequent firing step, and tension is not always necessary. If tension is to be applied, it may be of the magnitude which can at least prevent the spun fibers from becoming wavy even when they are shrunken at the time of rendering them infusible. Good results can be obtained with a tension of 1 to 500 g/mm². If a tension of less than 1 g/mm² is applied, the fibers cannot be maintained taut. On the other hand, a tension above 500 g/mm² may sometimes result in breakage of the fibers.

The spun fibers rendered infusible in the third step of the process of this invention have very high tensile strength and elongation, and these properties are very advantageous in producing continuous fibers. When in accordance with a usual method of producing SiC fibers from polycarbosilane, the polycarbosilane is spun and rendered infusible, the resulting fibers generally cannot have a tensile strength of more than 1.0 kg/mm² and an elongation of more than 2%. By contrast, the fibers rendered infusible in accordance with the method of this invention described in Example 1 have a tensile strength of 6.9 kg/mm² and an elongation of 23.0%. Accordingly, the infusible fibers in accordance with this invention lend themselves to easy handling, and their breakage at the time of subsequent firing can be reduced, thus increasing the yield of the final product.

In the fourth step of this invention, the infusible fibers are fired at a temperature in the range of 800° to 1800° C. to afford continuous inorganic fibers composed mainly of Si, Zr and C or Si, Zr, C and O.

The firing is carried out at a temperature of 800° to 1800° C. under tension or under no tension in vacuum or in an atmosphere of an inert gas or a reducing gas. As a result of the firing, the copolymer forming the spun fibers releases easily-volatile components by heat polycondensation reaction and thermal decomposition reaction. Volatilization of easily-volatile components is most vigorous when the temperature is in the range of 500° to 700° C., and therefore, the spun fibers are shrunken and bent. Application of a tension during the heating is especially advantageous for preventing bending. The magnitude of tension at this time may be at least the one at which the fibers do not become wavy when they are shrunken by heating. For practical purposes, good results are obtained by applying a tension in the range of 0.001 to 5 kg/mm². When the tension is below 0.001 kg/mm², the fibers cannot be maintained taut, and tensions exceeding 5 kg/mm² may result in breakage of the fibers. The firing may be performed in a multiplicity of stages which differ from each other in the heating conditions such as the atmosphere, the temperature and the time.

The fibers obtained by the aforesaid process sometimes contain graphite, free carbon, $SiO_2$ and $ZrO_2$ in addition to β-SiC, ZrC and a solid solution of β-SiC and ZrC and $ZrC_{1-x}$ wherein $0 < x < 1$, and depending upon the purpose of use, these secondary materials have to be removed. If desired, graphite, free carbon, $SiO_2$ or $ZrO_2$ can be removed from the fired fibers by dipping these fibers in sulfuric acid, nitric acid, a mixture of sulfuric acid and nitric acid, hydrochloric acid, a mixture of nitric acid and hydrochloric acid, a sulfuric acid-acidified solution of potassium bichromate, a sulfuric acid-acidified solution of potassium permanganate, hydrofluoric acid, a mixture of hydrofluoric acid and nitric acid, a mixture of hydrofluoric acid and sulfuric acid, etc. $SiO_2$ may be removed by dissolving it using NaOH, a molten salt such as borax, $Na_2CO_3$, $K_2CO_3$, $K_2CO_3/Na_2CO_3$, $Na_2SO_4$, $KNO_2$, NaCl, $KClO_3$, $Na_2O_2$ and $K_2CO_3/KNO_3$. Free carbon may be removed from the fibers by dissolving it with phosphoric acid.

Free carbon can also be removed by performing the firing in the fourth step at a temperature of at least 1000° C., and then heating the resulting fired fibers in an atmosphere of at least one gas selected from the group consisting of oxygen gas, air, ozone, hydrogen gas, steam and carbon monoxide gas preferably at a temperature of 800° to 1600° C. When the aforesaid heating is carried out at a temperature below 800° C., free carbon cannot be fully removed. Heating temperatures exceeding 1600° C. are undesirable because the composite carbide vigorously reacts with the atmospheric gas. The firing time in the above atmosphere must be long when the firing temperature is low, and may be short when the firing temperature is high. Good results are obtained by performing the firing at a low temperature for a relatively long period of time because the amount of the reaction product between the composite carbide and the atmospheric gas is small.

Application of tension is not always necessary in the decarbonization step, but when the heating is carried out at a high temperature while applying a tension of 0.001 to 100 kg, continuous inorganic fibers having reduced buckling can be obtained. Application of a tension of less than 0.001 kg/mm² is ineffective, and application of a tension of more than 100 kg/mm$^2$ cannot bring about a greater effect.

It is presumed that the spun fibers rendered infusible in the third step of the process of this invention begins to vigorously become inorganic at about 700° C. in the course of heating in the fourth step, and becomes almost completely inorganic at about 800° C. It is therefore necessary to perform the fourth step at a firing temperature of at least 800° C. The upper limit of the firing step in the fourth step is 1800° C., preferably 1000° to 1500° C., in order to obtain fibers having high tensile strength.

The continuous inorganic fibers of this invention are described below.

The continuous inorganic fibers of this invention are inorganic fibers composed substantially of Si, Zr and C or Si, Zr, C and O, and are produced by the process of this invention comprising the first to fourth steps described hereinabove. The structure of the fibers varies as shown in (A) to (C) below depending upon the temperature of firing in the fourth step.

(A) When the firing temperature is relatively low, inorganic fibers consisting substantially of an amorphous material are obtained. Depending upon the manufacturing conditions employed in the first to fourth steps, the amorphous material consists of Si, Zr, and C, or Si, Zr, C and O. Generally, when conditions which do not cause substantial remaining of oxygen in the fibers obtained by firing in the fourth step are selected in the first to fourth steps, an amorphous material composed mainly of Si, Zr and C results. Conversely, when conditions which cause easy remaining of oxygen in the fibers after firing are selected in the first to fourth steps, an amorphous material composed mainly of Si, Zr, C and O results. Oxygen remains more readily in the fired fibers as the amount of polyzirconosiloxane used is increased relative to the amount of polycarbosilane (in the case of using the first starting material) or the amount of the organozirconium compound (in the case of the second starting material) is increased relative to the amount of polycarbosilane in the production of the starting semi-inorganic block copolymer in the first step, or as oxidation of the fibers in the third step, takes place more readily (for example, the heating temperature in an oxidizing atmosphere is increased). Furthermore, by performing the firing in the fourth step in vacuum, oxygen is more readily removed than in the case of performing it in a stream of an inert gas such as nitrogen, and therefore, oxygen remains to a lesser extent in the fired fibers. For example, in Example (6) given hereinbelow, polyzirconocarbosilane is produced from a mixture of polycarbosilane and zirconium tetraisopropoxide in a weight ratio of 1:1 in the first step; the spun fibers are heated in the air to 110° C. to render them infusible in the third step; and the infusible fibers are fired at a relatively low temperature of 1000° C. in an argon gas. The resulting inorganic fibers consist substantially of an amorphous material composed mainly of Si, Zr, C and O. On the other hand, in Example 8 given hereinbelow, the weight ratio of polycarbosilane to zirconium tetraphenoxide in the first step is 15.4:1, and thus the relative amount of the organozirconium compound is small. Thus, the resulting inorganic fibers consist substantially of an amorphous material composed mainly of Si, Zr and C.

(B) When the firing temperature is high, there are obtained inorganic fibers consisting substantially of an aggregate of ultrafine crystalline particles of β-SiC, ZrC, a solid solution of β-SiC and ZrC, and ZrC$_{1-x}$ $(0<x<1)$ having a particle size of not more than 500 Å. Depending upon the manufacturing conditions employed in the first to fourth steps, amorphous SiO$_2$ and ZrO$_2$ may be present in the neighborhood of these ultrafine crystalline particles. For example, the inorganic fibers described in Example 4, (II) given hereinbelow are obtained by firing the infusible fibers obtained in Example 4, at a temperature of 1700° C. The inorganic fibers of Example 4, (II) consist of an aggregate of these ultrafine crystalline particles.

The reason for the formation of fibers of the aforesaid structure at a high firing temperature is described below. Fibers obtained by treatment in the third step have a thin oxide coating formed on their surfaces, but are mostly composed of the semi-inorganic block copolymer used as a starting material. The infusible fibers can be made inorganic by the firing treatment in the fourth step. At a relatively low firing temperature, the inorganic material formed is an amorphous material composed mainly of Si, Zr and C or Si, Zr, C and O, as stated in section (A) above, and no ultrafine crystalline particles have been produced. If the firing temperature rises further, a part of the amorphous material is gradually converted to an aggregate or ultrafine crystalline particles of β-SiC, ZrC, a solid solution of β-SiC and ZrC, and ZrC$_{1-x}$ $(0<x<1)$ having a particle size of not more than 500 Å. When the firing temperature is sufficiently high, substantially all of the amorphous material is converted to an aggregate of ultrafine crystalline particles. In conversion to the aggregate of ultrafine crystalline particles, when the amorphous material is composed mainly of Si, Zr and C, an aggregate consisting substantially of ultrafine crystalline particles of β-SiC, ZrC, a solid solution of β-SiC and ZrC, and ZrC$_{1-x}$ is formed. However, when the amorphous material is composed mainly of Si, Zr, C and O, amorphous SiO$_2$ and ZrO$_2$ are present in the neighborhood of the ultrafine crystalline particles.

(C) When the firing temperature is relatively high but does not cause complete conversion of an amorphous material to an aggregate of ultrafine crystalline particles, inorganic fibers composed of a mixture of the amorphous material described in (A) above and the aggregate of ultrafine crystalline particles described in (B) are obtained. As is clearly seen from the description in section (B) above, when the amorphous material is composed mainly of Si, Zr and C, there is formed a mixture of this amorphous material and an aggregate of ultrafine crystalline particles of β-SiC, ZrC, a solid solution of β-SiC and ZrC and ZrC$_{1-x}$. In contrast, when the amorphous material is composed mainly of Si, Zr, C and O, there is formed a mixture of this amorphous material and an aggregate of ultrafine crystalline particles of the aforesaid materials with amorphous SiO$_2$ and ZrO$_2$ formed in the neighborhood of the ultrafine crystalline particles.

As described hereinabove, the continuous inorganic fibers of this invention embrace various embodiments, and assume structures shown in types (A-1) to (C-2) below.

Type (A-1):

Continuous inorganic fibers consisting substantially of an amorphous material composed substantially of Si, Zr and C.

Type (A-2):

Continuous inorganic fibers consisting substantially of an amorphous material composed substantially of Si, Zr, C and O.

Type (B-1):

Continuous inorganic fibers consisting substantially of an aggregate of ultrafine crystalline particles of β-SiC, ZrC, a solid solution of β-SiC and ZrC, and $ZrC_{1-x}$ ($0<x<1$) having a particle size of not more than 500 Å.

Type (B-2):

Continuous inorganic fibers consisting substantially of an aggregate of ultrafine crystalline particles composed substantially of β-SiC, ZrC, a solid solution of β-SiC and ZrC, and $ZrC_{1-x}$ ($0<x<1$) having a particle diameter of not more than 500 Å, in which amorphous $SiO_2$ and $ZrO_2$ are present in the neighborhood of the ultrafine crystalline particles.

Type (C-1):

Continuous inorganic fibers consisting of a mixture of an amorphous material composed substantially of Si, Zr and C and an aggregate of ultrafine crystalline particles of β-SiC, ZrC, a solid solution of β-SiC and ZrC, and $ZrC_{1-x}$ ($0<x<1$) having a particle diameter of not more than 500 Å.

Type (C-2):

Continuous inorganic fibers consisting of a mixture of an amorphous material composed substantially of Si, Zr, C and O and an aggregate of ultrafine crystalline particles of β-SiC, ZrC, a solid solution of β-SiC and ZrC, and $ZrC_{1-x}$ ($0<x<1$) having a particle diameter of not more than 500 Å, in which amorphous $SiO_2$ and $ZrO_2$ are present in the neighborhood of the ultrafine crystalline particles.

In summary, when in the process for producing continuous inorganic fibers comprising the first to fourth steps, conditions in these steps are properly chosen to avoid substantial remaining of oxygen in the inorganic fibers obtained by firing in the fourth step, fibers of the type (A-1) structure are obtained at a relatively low firing temperature, fiber of the type (B-1) structure are obtained at a sufficiently high firing temperature, and fibers of the type (C-1) structure are obtained at a firing temperature intermediate of these. On the other hand, when such conditions are chosen in the above process which permit easy remaining of oxygen in the inorganic fibers obtained by firing in the fourth step, fibers of the type (A-2) structure are obtained at a relatively low firing temperature, fibers of the type (B-2) structure are obtained at a sufficiently high firing temperature, and fibers of the type (C-2) structure are obtained at a firing temperature intermediate of these.

Surprisingly, the continuous inorganic fibers of this invention, even of the type (A-1) or type (A-2) structure composed mainly of an amorphous material, exhibit very good strength and thermal properties. Generally, however, fibers composed of a mixture of an amorphous material and an aggregate of ultrafine crystalline particles as in type (C-1) or (C-2) have the best strength and other properties. This is presumably because the contribution of the amorphous material to these properties and the contribution of the aggregate of ultrafine crystalline particles to these properties act cooperatively to produce a synergistic effect.

Figure 2:
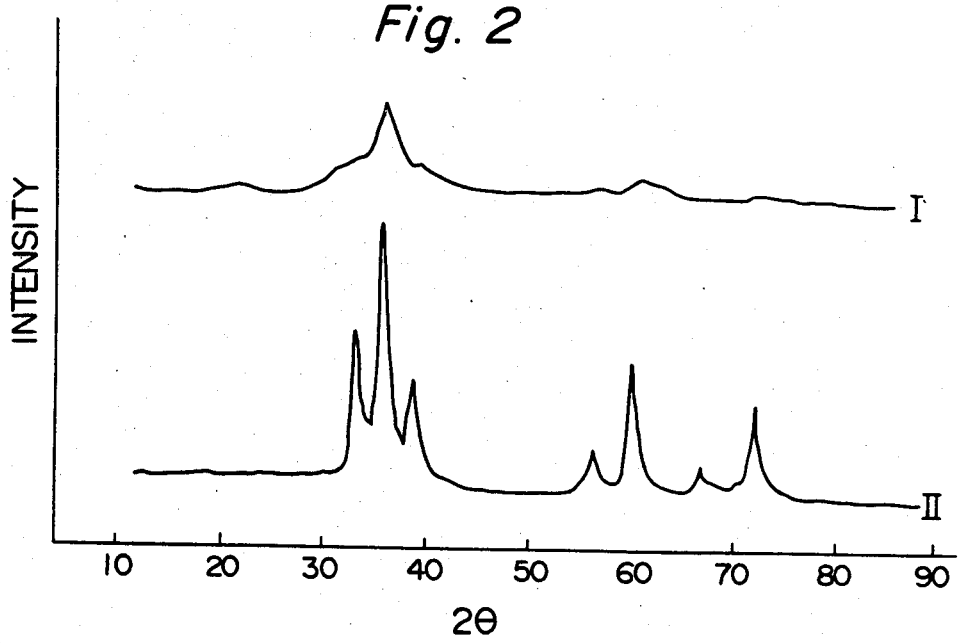
FIGS. 2, (I) and (II) respectively show X-ray powder diffraction patterns of the continuous inorganic fibers obtained in Example 4, (I) and 4, (II).

It can be ascertained by X-ray diffraction patterns of fibers that the ultrafine crystalline particles present in the continuous inorganic fibers of the type (B-1), (B-2), (C-1) or (C-2) structure are composed of a composite carbide consisting of β-SiC, ZrC, a solid solution of β-SiC and ZrC and $ZrC_{1-x}$ ($0<x<1$). FIG. 2-(II) is an X-ray powder diffraction pattern of the continuous inorganic fibers of this invention having the type (B-1) structure described in Example 4, II given hereinbelow. In the X-ray diffraction pattern of (II) shows a diffraction line (III) of β-SiC appearing at $2\theta=35.8°$, a diffraction line (220) of β-SiC at $2\theta=60.2°$, a diffraction line (311) of β-SiC at $2\theta=72.1°$, a diffraction line (111) of ZrC at $2\theta=33.7°$, a diffraction line (200) of ZrC at $2\theta=39.1°$, a diffraction line (220) of ZrC at $2\theta=56.3°$, a diffraction line (311) of ZrC at $2\theta=67.0°$, and a diffraction line (222) of ZrC at $2\theta=70.6°$. It is especially noteworthy that the diffraction lines of ZrC are shifted to a higher angle side than those of conventional ZrC, and the lattice constant of the ZrC differs from that of conventional ZrC.

The above X-ray diffraction data show that the ultrafine crystalline particles present in the continuous inorganic fibers consist mainly of β-SiC and TiC and partly contain a solid solution of β-SiC and ZrC, and $ZrC_{1-x}$ ($0<x<1$).

The continuous inorganic fibers containing Si, Zr and C and composed of ultrafine crystalline particles of such a unique composite carbide are novel fibers quite unknown heretofore. In addition, that the ultrafine crystalline particles are composed of such a composite carbide brings about the advantage of giving very desirable superior properties to the continuous inorganic fibers of this invention containing Si, Zr and C. ZrC has higher mechanical strengths, such as flexural strength, tensile strength and pressure resistance, than β-SiC, and because of its high melting point, also possesses excellent heat resistance. The continuous inorganic fibers of this invention have both ZrC and β-SiC, which are present in an intimate condition in the fibers of this invention as is clear from the fact that both ZrC and β-SiC are partly dissolved to form a solid solution. Because of this, the desirable properties of ZrC are noticeably exhibited in the resulting continuous inorganic fibers. Thus, the continuous inorganic fibers of this invention have better mechanical strength properties and heat resistance than conventional fibers composed mainly of β-SiC.

The fine crystalline particles composed of the composite carbide which are present in the continuous inorganic fibers of this invention are ultrafine particles having an average particle diameter of not more than 500 Å. For example, it has been ascertained by X-ray diffraction that the ultrafine crystalline particles in the fibers of the type (C-1) structure described in Example 4, (I) given hereinbelow (firing temperature 1300° C.) have an average particle diameter of about 80 Å, and the ultrafine crystalline particles in the fibers of the type (B-1) structure described in Example 4, (II) described hereinbelow (firing temperature 1700° C.) have a particle diameter of about 160 Å.

As the firing temperature is increased, the crystalline particles in the resulting continuous inorganic fibers of this invention have an increased average particle diameter.

One of the reasons for the very high strength of the inorganic fibers of this invention is presumably that they are composed of ultrafine crystalline particles. Since a localized concentration of stress disperses through the crystal grain boundary of high density, the fibers have resistance to deformation. Because the crystals are in ultrafine particles, there is no room in the crystal grains for dislocation required for deformation. Since the crystal grain size is very small, the apparent surface tension of the particles is extraordinarily high, and the fibers have high resistance to deformation. Furthermore, since the surface of the fibers is smooth and free from depressions and raisings, a stress does not concentrate on the uneven portion and therefore, no decrease in strength occurs.

Generally, fibers of the type (C-1) or (C-2) structure obtained which the firing temperature is medium have better strength properties than fibers of the type (B-1) or (B-2) structure obtained at a very high firing temperature. This is presumably because the average crystal grain size of the particles is smaller owing to the lower firing temperature.

Chemical analysis of the continuous inorganic fibers of this invention shows that they generally contain 5 to 60% by weight of Si, 0.5 to 45% by weight of Zr, 25 to 40% by weight of C, and 0.01 to 30% by weight of O.

As is clear from the foregoing description, inorganic fibers containing at most 30% by weight of oxygen can be obtained by selecting such manufacturing conditions as to permit easy remaining of oxygen in the fibers obtained after the firing step. Fibers of the type (A-2), (B-2) and (C-2) structures contain substantial amounts of oxygen. It has been found by X-ray diffraction analysis that the fibers of the type (A-2) structure consist mainly of an amorphous material composed of Si, Zr, C and O. In the fibers of the type (B-2) structure, the ultrafine crystalline particles consist of a composite carbide composed substantially of Si, Zr and C, and oxygen atoms do not participate in the formation of the ultrafine crystalline particles, as is seen from the results of X-ray diffraction analysis. In this case, the oxygen atoms are bonded to some of Si and Zr atoms to form amorphous $SiO_2$ and $ZrO_2$ which are considered to be present in the vicinity of the ultrafine crystalline particles of the composite carbide, for example in the interspaces between the crystalline particles.

The continuous inorganic fibers of this invention have a novel structure and exhibit superior mechanical strength, heat resistance and oxidation resistance, and have better wetting with metals and alloys than carbon fibers. They also have low reactivity with metals and alloys. These fibers in accordance with this invention are useful as fibrous materials for fiber-reinforced metals, plastics and rubbers, fibrous panel heaters, fire-retardant fabrics, acid-resistant diaphragms, and also as reinforcing fibers in nuclear reactor materials, airplane structural materials, bridges, building materials, nuclear fusion reactor materials, rocket materials, light-emitting structures, polishing cloths, wire ropes, marine exploiting materials, golf shaft materials, skiing stock materials, tennis racket materials, fishing rods, and shoe soles.

The following Examples illustrate the present invention more specifically. Examples 1 to 3 cover the use of the first starting material (organometallic copolymer), and Examples 4 to 8, the use of the second starting material (polyzirconocarbosilane).

REFERENTIAL EXAMPLE 1

A 5-liter three-necked flask was charged with 2.5 liters of anhydrous xylene and 400 g of sodium, and they were heated to the boiling point of the xylene in a stream of nitrogen gas. One liter of dimethyldichlorosilane was added dropwise over 1 hour. After the addition, the mixture was heated under reflux for 10 hours to form a precipitate. The precipitate was collected by filtration, and washed first with methanol and then with water to afford 420 g of polydimethylsilane as a white powder.

Separately, 759 g of diphenyldichlorosilane and 124 g of boric acid were heated at a temperature of 100° to 120° C. in n-butyl ether in an atmosphere of nitrogen gas. The resulting white resinous product was further heated in vacuum at 400° C. for 1 hour to afford 530 g of polyborodiphenylsiloxane.

Then 8.27 g of the polyborodiphenylsiloxane was added to 250 g of the polydimethylsilane, and they were mixed. The mixture was heated to 350° C. in a stream of nitrogen in a 2-liter quartz tube equipped with a reflux tube, and polymerized at this temperature for 6 hours to obtain polycarbosilane partly containing siloxane linkages, one starting material used in this invention. After allowing the product to cool at room temperature, xylene was added, and the product was taken out as a xylene solution. The solution was filtered, and the xylene was evaporated. The residue was concentrated at 320° C. for 1 hour in a stream of nitrogen to obtain 140 g of solid polycarbosilane.

REFERENTIAL EXAMPLE 2

Diphenylsilanediol (864 g) and 383 g of zirconium tetrabutoxide were weighed, and xylene was added. The mixture was refluxed for 1 hour at 150° C. After the reaction, the insoluble matter was removed by filtration, and the xylene solvent was removed by an evaporator. The resulting intermediate was further polymerized at 300° C. for 1 hour in an atmosphere of nitrogen to afford polyzirconosiloxane. In the resulting polyzirconosiloxane, the zirconium/silicon atomic ratio (Zr/Si) was about 1:4.

EXAMPLE 1

Forty grams of the polycarbosilane obtained in Referential Example 1 and 40 g of the polyzirconosiloxane obtained in Referential Example 2 were mixed, and 400 ml of xylene was added to form a homogeneous solution. The solution was refluxed at 130° C. for 3 hours with stirring in an atmosphere of nitrogen gas. After the refluxing reaction, the reaction mixture was further heated to 200° C. to distill off the xylene solvent, and then polymerized at 270° C. for 1 hour to afford an organometallic copolymer.

The organometallic copolymer was melted at 250° C. in a spinning apparatus and melt-spun at a spinning speed of 400 m/min. in the air through orifices having a diameter of 300 μm. The resulting fibers were heated in the air under no tension at a rate of 15° C./hour from room temperature, and maintained at 130° C. for 0.5 hour to render them infusible. The infusible fibers had a tensile strength of 6.9 kg/mm$^2$ and an elongation of 23.0%.

The infusible fibers were fired under the following three different conditions (I) and (II).

(I) The infusible fibers were heated in a stream of nitrogen gas (100 cc/min.) under no tension to 1200° C. over the course of 12 hours, and then maintained at 1200° C. for 1 hour. The resulting continuous inorganic fibers had a diameter of about 20 microns, a tensile strength of 240 kg/mm$^2$ and a modulus of elasticity of 11.0 tons/mm$^2$.

(II) The infusible fibers were heated to 1700° C. over the course of 17 hours in a stream of nitrogen (100 cc/min) under no tension, and maintained at 1700° C. for 1 hour. The X-ray powder diffraction pattern of the resulting fibers is shown in FIG. 1. From the fact that sharp and high-intensity diffraction lines of β-SiC and ZrC were observed in FIG. 1, (the individual diffraction lines of ZrC were shifted to a higher angle size), and from the results of chemical analysis of these fibers, it was ascertained that the fibers obtained under the firing conditions (II) are fibers having the type (B-2) structure. X-ray diffraction analysis showed that the ultrafine crystalline particles present in the fibers had an average particle diameter of about 160 Å.

EXAMPLE 2

600 g of diphenylsilanediol and 675 g of tetrakis-acetylacetonatozirconium were weighed and a mixture of xylene and ethanol (in a volume ratio of 4:1) was added. They were reacted in the same way as in Example 1 except that after the removal of the solvents, the reaction was carried out at 250° C. for 30 minutes. Thus, polyzirconosiloxane was obtained which had a number average molecular weight of 950 and in which the ratio of the total number of zirconoxane linkages to that of siloxane linkages was 1:2.

95 g of the resulting polymer and 40 g of the polycarbosilane obtained in Referential Example 1 were weighed, and 500 mg of xylene was added to the mixture to form a homogeneous solution. The solution was refluxed at 130° C. for 2 hours with stirring in an atmosphere of nitrogen gas. After the refluxing reaction, the reaction mixture was further heated to 250° C. to distill off the xylene solvent, and then polymerized at 250° C. for 3 hours to obtain an organometallic copolymer. The organometallic copolymer was dissolved in benzene to form a spinning dope. The dope was spun by a dry spinning method from a spinneret (250 μm) at a spinning speed of 200 m/min. The fibers were heated in the air at a rate of 7° C./hour from room temperature under a tension of 50 g/mm$^2$, and maintained at 155° C. for 1 hour to render them infusible. The infusible fibers had a tensile strength of 6.0 kg/mm$^2$ and an elongation of 20.5%.

The infusible fibers were heated to 1300° C. over the course of 6.5 hours in vacuum ($3 \times 10^{-3}$ mmHg) while placing them under a tension of 50 g/mm$^2$. The continuous inorganic fibers obtained had a diameter of about 15 microns, a tensile strength of 280 kg/mm$^2$ and a modulus of elasticity of 15 tons/mm$^2$.

EXAMPLE 3

72 g of the polycarbosilane obtained in Referential Example 1 and 8 g of polyzirconosiloxane explained in Referential Example 2 were weighed, and 400 ml of benzene was added to this mixture to form a homogeneous solution. The solution was refluxed at 70° C. for 5 hours with stirring in an atmosphere of nitrogen. After the refluxing reaction, the reaction mixture was further heated to distill off the benzene, and polymerized at 280° C. for 1 hour to form an organometallic copolymer. The organometallic copolymer was melted at 270° C. in a spinning apparatus and melt-spun from a spinneret (500 μm) at a spinning speed of 500 m/min. in the air to form fibers. The fibers were subjected to the irradiation of gamma-rays ($1.56 \times 10^6$ γ) in the air at 50° C. under no tension to render them infusible. The resulting infusible fibers had a tensile strength of 6.5 kg/mm$^2$ and an elongation of 22.0%.

The infusible fibers were then heated under no tension to 1000° C. over 2.5 hours in a stream of mixture of carbon monoxide and argon (CO:Ar=1:4 by mole) (100 cc/min.), and maintained at 1000° C. for 1 hour to fire them. The fired fibers were heated to 800° C. over 2 hours in the air, and maintained at 800° C. for 0.5 hour to remove the excess carbon in the fibers. The resulting continuous inorganic fibers had a diameter of 25 microns, a tensile strength of 190 kg/mm$^2$ and a modulus of elasticity of 9.5 tons/mm$^2$.

REFERENTIAL EXAMPLE 3

One hundred grams of tetramethylsilane was reacted at 770° C. for 24 hours in an atmosphere of nitrogen in a flowing-type apparatus adapted for recycling. Thus, polycarbosilane was obtained. The polymer was allowed to cool to room temperature. Then, n-hexane was added, and the product was withdrawn as an n-hexane solution. The solution was filtered to remove the insoluble matter and the n-hexane was evaporated. The residue was concentrated at 180° C. and 5 mmHg for 1 hour to afford 14 g of a tacky polymer.

REFERENTIAL EXAMPLE 4

The polydimethylsilane (250 g) obtained in Referential Example 1 was put into an autoclave, and polymerized at 470° C. and about 100 atms. for 14 hours in an atmosphere of argon to form polycarbosilane. The product was allowed to cool to room temperature, and n-hexane was added. The product was withdrawn as an n-hexane solution. The n-hexane was evaporated, and the residue was concentrated at 280° C. and 1 mmHg for 1 hour. The resulting solid was treated with acetone to remove low-molecular-weight materials. The was obtained 60 g of a polymer.

EXAMPLE 4

Xylene (300 ml) and 20 ml of ethanol were added to a mixture of 40.0 g of the polycarbosilane obtained in Referential Example 1 and 5.4 g of tetrakis-acetylacetonatozirconium to form a homogeneous solution. The solution was refluxed at 60° C. for 2 hours in an atmosphere of nitrogen gas. After the refluxing reaction, the reaction mixture was heated to distill off the xylene and ethanol, and then polymerized at 285° C. for 30 minutes to afford polyzirconocarbosilane.

The polyzirconocarbosilane was heat-melted at 270° C. in a spinning apparatus and melt-spun in the air through orifices having a diameter of 300 μm at a spinning speed of 300 m/min. The resulting fibers were heated in the air at a rate of 15° C./hr from room temperature under no tension, and maintained at 110° C. for 1 hour. The resulting infusible fibers had a tensile strength of 5.0 kg/mm$^2$ and an elongation of 13.0%.

The infusible fibers were fired under the following two different conditions (I) and (II).

(I) The infusible fibers were heated to 1300° C. over the course of 13 hours under no tension in a stream of nitrogen (100 cc/min.), and maintained at 1300° C. for 1 hour. The resulting continuous inorganic fibers had a diameter of about 13 microns, a tensile strength of 270 kg/mm$^2$ and a modulus of elasticity of 13.0 tons/mm$^2$.

An X-ray diffraction pattern of the resulting fibers is shown in FIG. 2, (I). FIG. 2, (I) shows broad diffraction lines of β-SiC and broad low-intensity diffraction lines of ZrC (the diffraction lines of ZrC were shifted to a higher angle side than conventional ZrC. From this fact and the results of chemical analysis of these fibers, the fibers obtained under the firing conditions (I) above were found to have the type (C-1) structure. X-ray diffraction analysis showed that the ultrafine crystalline particles present in the fibers had an average particle diameter of about 80 Å.

(II) The infusible fibers were heated to 1700° C. over the course of 17 hours under no tension in a stream of nitrogen (100 cc/min.), and maintained at 1700° C. for 1 hour to fire them. An X-ray powder diffraction pattern of the resulting fibers is shown in FIG. 2, (II). In FIG. 2, (II), sharp and high-intensity diffractions lines of $\beta$-SiC and ZrC were observed (the diffraction lines of ZrC were shifted to a higher angle side). From this fact and the results of chemical analysis of these fibers, the fibers obtained under the firing conditions (II) were found to be of the type (B-1) structure. X-ray analysis showed that the ultrafine crystalline particles present in the fibers had an average particle diameter of about 160 Å.

EXAMPLE 5

Xylene (400 ml) was added to a mixture of 40.0 g of the polycarbosilane obtained in Referential Example 1 and 31.5 g of zirconium tetrabutoxide to form a homogeneous solution. The solution was refluxed at 130° C. for 1 hour with stirring in an atmosphere of argon gas. After the refluxing reaction, the reaction mixture was further heated to 250° C. to distill off the xylene, and then polymerized at 250° C. for 1 hour to afford polyzirconocarbosilane.

The polyzirconocarbosilane was heat-melted at 230° C. in a spinning apparatus, and melt-spun in the air through orifices having a diameter of 250 $\mu$m at a spinning speed of 200 m/min. The fibers were heated at a rate of 7° C./hour from room temperature in the air while applying a tension of 50 g/mm$^2$, and maintained at 155° C. for 3 hours. The infusible fibers had a tensile strength of 5.5 kg/mm$^2$ and an elongation of 17.0%.

The infusible fibers were heated to 1200° C. over the course of 6 hours under no tension in vacuum ($3 \times 10^{-3}$ mmHg), and maintained at 1200° C. for 3 hours to fire them. The resulting continuous inorganic fibers had a diameter of about 20 microns, a tensile strength of 200 kg/mm$^2$, and a modulus of elasticity of 70.0 tons/mm$^2$.

X-ray powder diffraction and chemical analysis showed that the resulting fibers had the type (C-2) structure.

EXAMPLE 6

The polymer obtained in Referential Example 1 was concentrated at 330° C. for 3 hours to obtain polycarbosilane. Benzene (500 ml) was added to a mixture of 40.0 g of the resulting polycarbosilane and 75.3 g of zirconium tetraisopropoxide to afford a homogeneous solution. The solution was refluxed at 70° C. for 5 hours with stirring in an atmosphere of argon gas. After the refluxing reaction, the reaction mixture was further heated to distill off benzene, and then polymerized at 200° C. for 2 hours to afford polyzirconocarbosilane.

The polyzirconocarbosilane was dissolved in benzene to form a spinning dope. The dope was spun from orifices having a diameter of 300 $\mu$m at a spinning speed of 300 m/min. by a dry-spinning method. The resulting fibers were heated at a rate of 15° C./hour in the air under no tension, and maintained at 110° C. for 0.5 hour to render them infusible. The infusible fibers had a tensile strength of 4.7 kg/mm$^2$ and an elongation of 12.0%.

The infusible fibers were heated to 100° C. over the course of 5 hours in a stream of argon gas (100 cc/min.) under a tension of 50 g/mm$^2$, and then maintained at 1000° C. for 1 hour to fire them. The resulting continuous inorganic fibers had a diameter of 16 microns, a tensile strength of 190 kg/mm$^2$ and a modulus of elasticity of 12 tons/mm$^2$.

X-ray powder diffraction and chemical analysis showed that the resulting fibers had the type (A-2) structure.

EXAMPLE 7

Ethanol (60 ml) and 300 ml of xylene were added to a mixture of 40.0 g of the polycarbosilane obtained in Referential Example 3 and 14.3 g of tetrakis-acetonatozirconium to form a homogeneous solution. The solution was refluxed at 60° C. for 8 hours in an atmosphere of nitrogen gas. After the refluxing reaction, the reaction mixture was further heated to distill off ethanol and xylene, and polymerized at 250° C. for 3 hours to form polyzirconocarbosilane.

The polyzirconocarbosilane was heat-melted at 240° C. in a spinning apparatus, and melt-spun through orifices having a diameter of 250 $\mu$m at a spinning speed of 650 m/min. in the air. The resulting fibers were exposed to irradiation of $\gamma(1.56 \times 10^6$ roentgens) in the air at 50° C. under no tension. The resulting infusible fibers had a tensile strength of 6.0 kg/mm$^2$ and an elongation of 18.1%.

The infusible fibers were heated to 1300° C. over the course of 13 hours under a tension of 50 g/mm$^2$ in a stream of nitrogen (100 cc/min.), and maintained at 1300° C. for 1 hour to fire them. The resulting continuous inorganic fibers had a diameter of 9 microns, a tensile strength of 320 kg/mm$^2$ and a modulus of elasticity of 21 tons/mm$^2$.

X-ray powder diffraction analysis and chemical analysis showed that the resulting fibers had the type (C-2) structure.

EXAMPLE 8

Xylene (200 ml) was added to a mixture of 40.0 g of the polycarbosilane obtained in Referential Example 4 and 2.6 g of zirconium tetraphenoxide to form a homogeneous solution. The solution was refluxed at 130° C. for 2 hours in an atmosphere of argon gas. After the refluxing reaction, the reaction mixture was further heated to distill off the xylene, and then polymerized at 300° C. for 30 minutes to obtain polyzirconocarbosilane.

The polyzirconocarbosilane was dissolved in toluene to prepare a spinning dope. The spinning dope was spun through orifices having a diameter of 300 microns at a spinning speed of 200 m/min. by a dry spinning method. The resulting fibers were heated at a rate of 30° C./hr from room temperature in the air under a tension of 50 g/mm$^2$, and maintained at 110° C. for 0.5 hour to render them infusible. The infusible fibers had a tensile strength of 4.8 kg/mm$^2$ and an elongation of 13.0%.

The infusible fibers were heated to 1000° C. over the course of 5 hours under no tension in a stream (100 cc/min.) of carbon monoxide and nitrogen (CO:N$_2$ mole ratio = 1:4), and maintained at 1000° C. for 1 hour to fire them. The fired fibers were further heated in the air to 800° C. over the course of 2 hours, and maintained at 800° C. for 0.5 hour to remove the excess of carbon in the fired fibers. The resulting continuous inorganic fibers had a diameter of 20 microns, a tensile strength of 195 kg/mm$^2$ and a modulus of elasticity of 9.0 tons/mm$^2$.

X-ray powder diffraction and chemical analysis showed that the resulting fibers had the type (A-1) structure.

What we claim is:

1. Novel continuous, fired, infusible inorganic fibers made from a semi-inorganic block copolymer comprising polycarbosilane blocks having a main chain skeleton consisting essentially of carbosilane units of the formula $+Si-CH_2+$, each silicon atom of said carbosilane units having bonded thereto a side-chain group selected from the group consisting of hydrogen, lower alkyl and phenyl, and zirconoxane units of the formula $+Zr-O+$, said fibers being composed of
(1) an amorphous material consisting essentially of Si, Zr and C, or
(2) an aggregate consisting essentially of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å, or
(3) a mixture of said amorphous material (1) and said aggregate (2) of ultrafine crystalline particles.

2. The fibers of claim 1 which consist essentially of an amorphous material composed essentially of Si, Zr and C.

3. The fibers of claim 1 which consist essentially of an aggregate of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å.

4. The fibers of claim 1 which consist of a mixture of an amorphous material composed essentially of Si, Zr and C and an aggregate composed essentially of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å.

5. Novel continuous, fired, infusible inorganic fibers made from a semi-inorganic block copolymer comprising polycarbosilane blocks having a main chain skeleton consisting essentially of carbosilane units of the formula $+Si-CH_2+$, each silicon atom of said carbosilane units having bonded thereto a side-chain group selected from the group consisting of hydrogen, lower alkyl and phenyl, and zirconoxane units of the formula $+Zr-O+$, said fibers being composed of
(1) an amorphous material consisting essentially of Si, Zr, and C and O, or
(2) an aggregate consisting essentially of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å, or
(3) a mixture of said amorphous material (1) and said aggregate (2) of ultrafine crystalline particles.

6. The fibers of claim 5 which consist essentially of an amorphous material composed essentially of Si, Zr, C and O.

7. The fibers of claim 5 which consist of a mixture of an amorphous material composed essentially of Si, Zr, C and O and an aggregate composed essentially of ultrafine crystalline particles of $\beta$-SiC, ZrC, a solid solution of $\beta$-SiC and ZrC and $ZrC_{1-x}$ wherein $0<x<1$ and having a particle diameter of not more than 500 Å.

8. Novel continuous, fired, infusible inorganic fibers made from a
semi-inorganic block copolymer comprising polycarbosilane blocks having a main chain skeleton consisting essentially of carbosilane units of the formula $+Si-CH_2+$, each silicon atom of said carbosilane units having bonded thereto a side-chain group selected from the group consisting of hydrogen, lower alkyl and phenyl, and zirconoxane units of the formula $+Zr-O+$, said fibers being composed of
(1) an amorphous material consisting essentially of Si, Zr, and C and O, or
(2) an aggregate consisting essentially of amorphous $SiO_2$ and $ZrO_2$, ultrafine crystalline particles of $\beta$-SiC, ZrC, a solid solution of $\beta$-SiC and ZrC and $ZrC_{1-x}$ wherein $0<x<1$ and having a particle diameter of not more than 500 Å, or
(3) a mixture of said amorphous material (1) and said aggregate (2) of ultrafine crystalline particles.

9. The fibers of claim 8 which consist essentially of an aggregate of amorphous $SiO_2$ and $ZrO_2$, ultrafine crystalline particles of $\beta$-SiC, ZrC, a solid solution of $\beta$-SiC and ZrC and $ZrC_{1-x}$ wherein $0<x<1$ and having a particle diameter of not more than 500 Å.

* * * * *